T. LUCAS.
BOLL WEEVIL MACHINE.
APPLICATION FILED APR. 25, 1911.
1,046,206.
Patented Dec. 3, 1912.
4 SHEETS—SHEET 1.
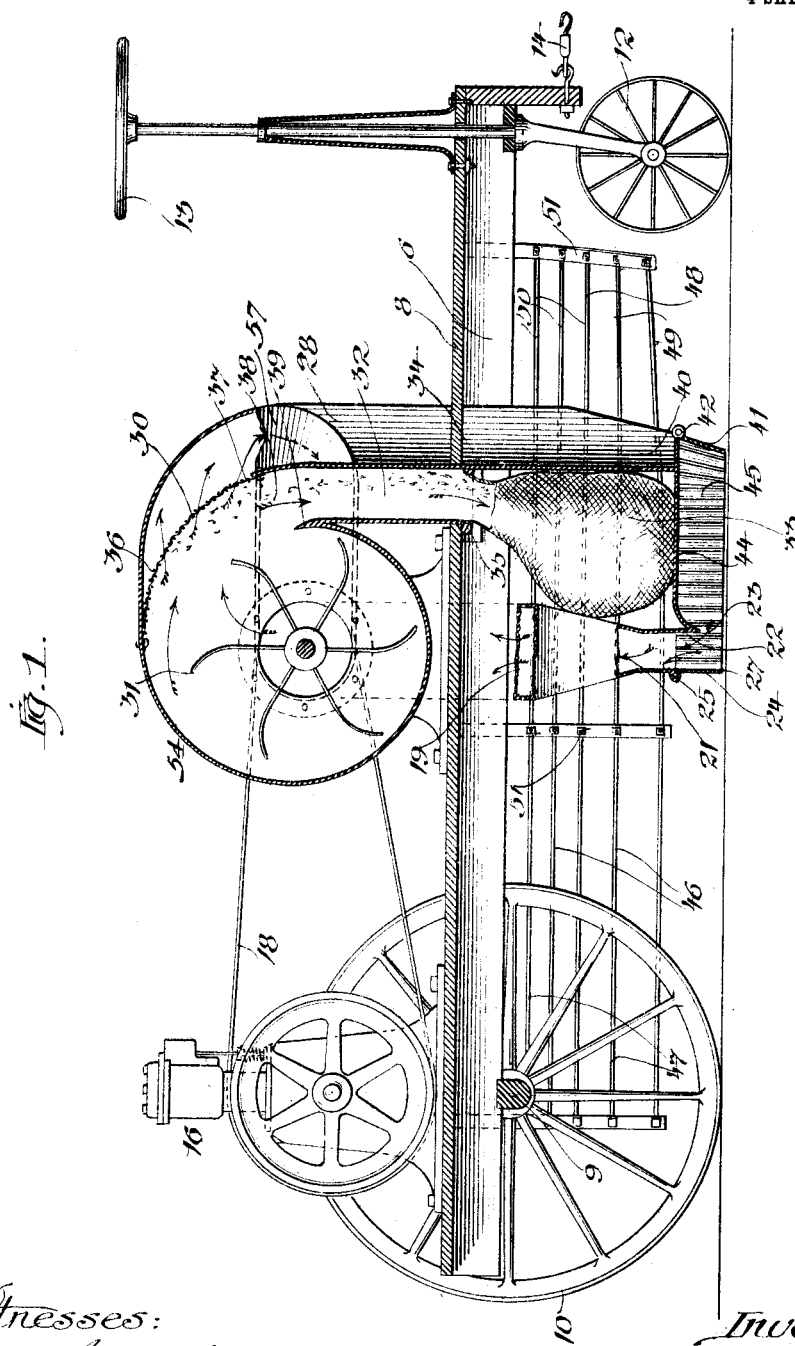
Witnesses:
Frank S. Blanchard
Frances M. Frost
Inventor:
Thomas Lucas
By Banning & Banning
Attorneys

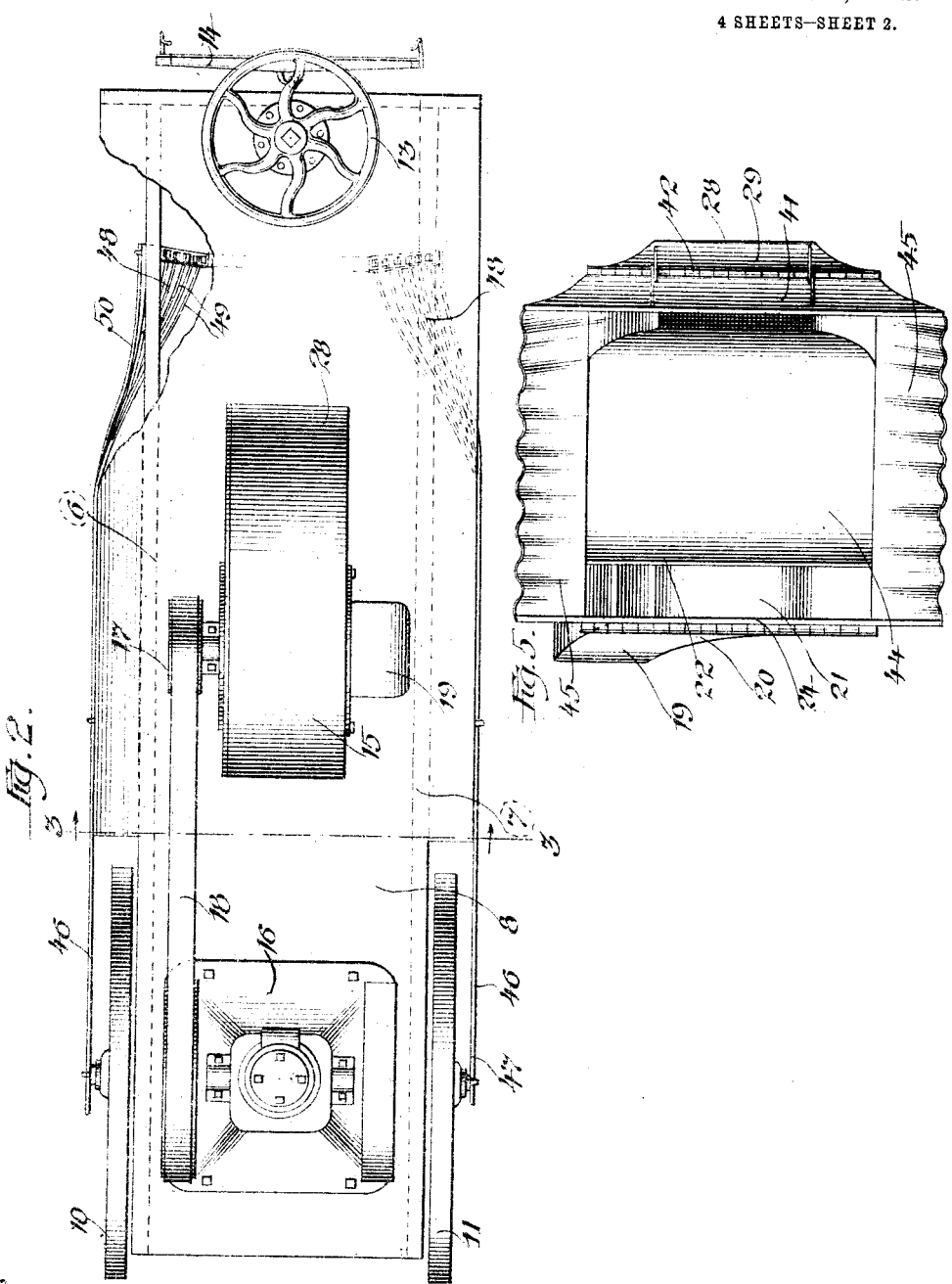

T. LUCAS.
BOLL WEEVIL MACHINE.
APPLICATION FILED APR. 25, 1911.
1,046,206.
Patented Dec. 3, 1912.
4 SHEETS—SHEET 3.
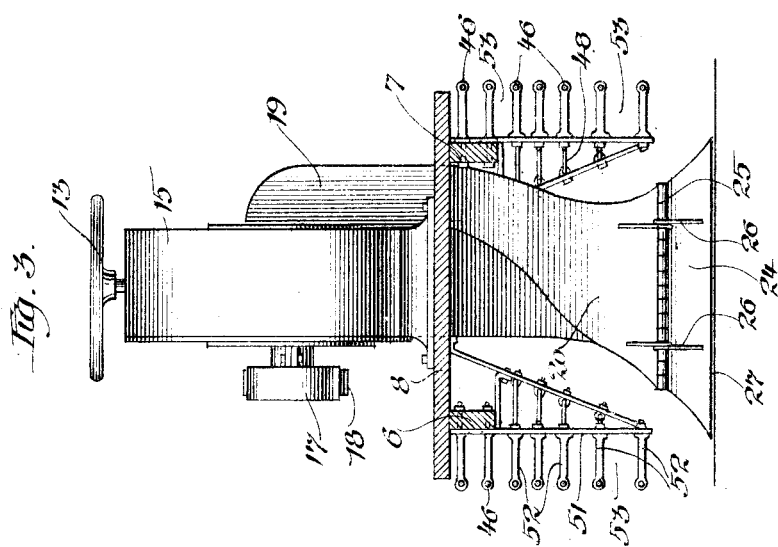
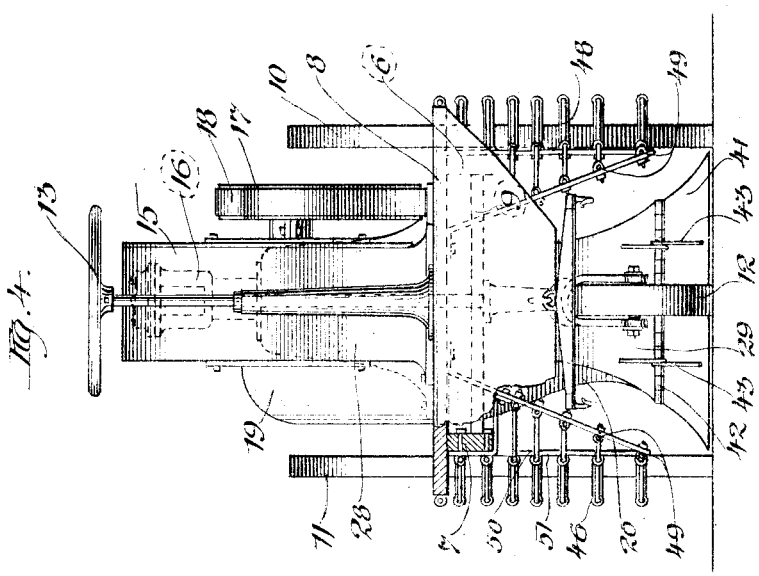

T. LUCAS.
BOLL WEEVIL MACHINE.
APPLICATION FILED APR. 25, 1911.
1,046,206.
Patented Dec. 3, 1912.
4 SHEETS—SHEET 4.
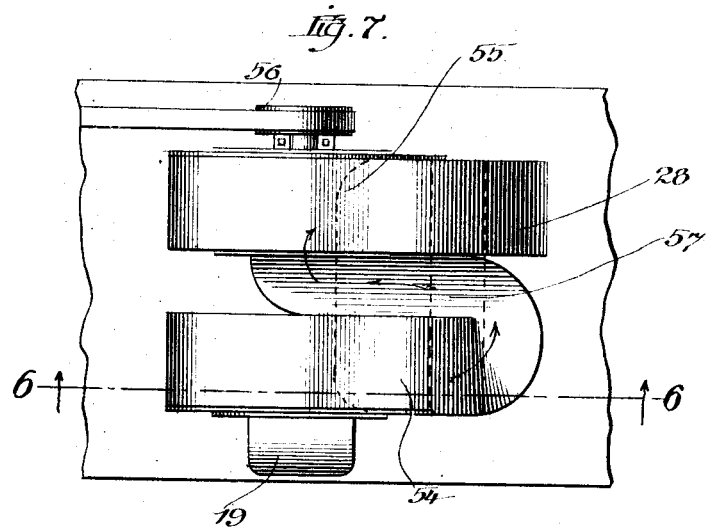
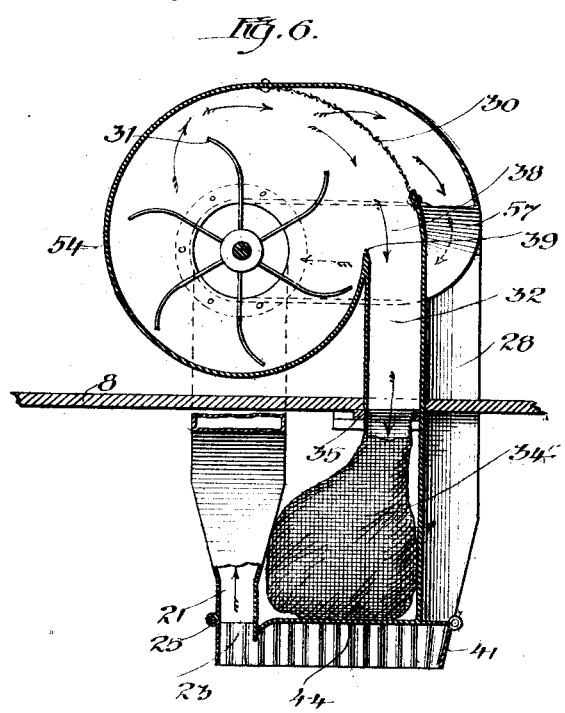

UNITED STATES PATENT OFFICE.

THOMAS LUCAS, OF GREENWOOD, MISSISSIPPI.

BOLL-WEEVIL MACHINE.

1,046,206.  Specification of Letters Patent.  Patented Dec. 3, 1912.

Application filed April 25, 1911. Serial No. 623,188.

*To all whom it may concern:*

Be it known that I, THOMAS LUCAS, a citizen of the United States, residing at Greenwood, in the county of Leflore and State of Mississippi, have invented a certain new and useful Boll-Weevil Machine or the Like, of which the following is a specification.

This invention relates to a new and useful machine intended particularly for clearing the ground of small twigs and pieces of wood and the like, particularly in cotton fields, where such pieces of wood become breeding places for insect pests, such as boll-weevils.

It is intended particularly to provide a machine which may be drawn or propelled through a field of cotton between the rows of bushes thereof to pick up all of the twigs, etc., in the rows and up close to the bushes, so that the twigs, etc., may be carried away and burned, or otherwise destroyed, thus also destroying the insects. There are a large number of insect pests which deposit their eggs or larvæ in small twigs and other pieces of wood and debris, which debris falls on the ground until the proper season of the year, when the insects emerge from the debris and enter the ground or find their way into cotton bushes and similar cultivated plants. By picking up these twigs, etc., it is possible to collect a large majority of the eggs and larvæ which would become the pest of the next ensuing season, and by burning them, the next pest will be largely reduced. It is easy enough to pick up large branches and comparatively large debris from a field, but by far the greatest percentage of the insects are found on small twigs and the like, which cannot be conveniently raked together, or picked up by hand, and, therefore, it is extremely difficult to rid the field of this large percentage of the pest.

It is the main object of this invention to provide a machine of suitable construction and principle of operation for gathering up all such debris and particularly the small pieces thereof, and collecting the same, so that it may be carried away from the field.

Other objects of the invention are to provide a machine of such construction that a comparatively large width of field may be cleaned at one time, as, for example, the entire strip of ground between two rows of cotton bushes; to provide a machine of such construction that the ground will be considerably agitated just before the suction portion of the mechanism passes over it, thus insuring that the small twigs will be properly loosened up, so that they will be drawn up into the machine; to provide a machine of simple construction and operation, and one which may be easily mounted on a comparatively small truck; to so form the truck that the branches of cotton, or similar bushes, will not be injured by the passage of the machine; to provide a suction member, which will ride easily over comparatively uneven ground, while, at the same time, always maintaining a comparatively close contact therewith; to provide a machine of such construction that the debris receptacle may be easily removed from the same, when it becomes filled; and in other ways and manners to provide a machine of this character, which shall meet all of the foregoing as well as other conditions and requirements.

Other objects and uses will appear from a detailed description of the invention, which consists in the features of construction and combination of parts hereinafter described and claimed.

Referring now to the drawings, Figure 1 shows a longitudinal section of the mechanism; Fig. 2 shows a plan view of the mechanism with a modified form of fan; Fig. 3 shows a cross section of the mechanism taken on the line 3—3 of Fig. 2, looking in the direction of the arrows; Fig. 4 shows a front view of the mechanism shown in Fig. 2; Fig. 5 shows a bottom view of the suction member, and Figs. 6 and 7 show a construction, in which two fans in series are used for creating the blast of air, the first fan sucking the debris from the ground and delivering it to the receptacle, while the second fan creates the blast of air against the ground, Fig. 6 being taken on the line 6—6 of Fig. 7 looking in the direction of the arrows.

In the embodiment of my invention, I provide a truck of suitable shape and size according to the class of work to be performed. The width of the truck should be such that it may move along easily between the rows of plants without damaging the same. On this truck, I mount a suitable suction member, and provide means for creating a continuous suction in the same, the suction member being carried down close to the ground, so that the twigs, etc., will be readily drawn up. The most convenient device for creating the suction is a mechanically driven blower. I provide a diverting member, or the like, across the exhaust from said blower, and suitably connect a debris receptacle to the blower, so that the pieces of debris, which are taken up into the fan, will be diverted and thrown into the receptacle. In order to better insure a complete and thorough cleaning of the ground, I carry the exhaust from the blower down and direct the same against the ground in advance of the point of suction. The exhaust thus serves to loosen up the surface of the ground, so that all of the debris will be easily drawn up in the suction member. The arrangement is one which virtually provides a closed circuit system, although it will, of course, be understood that it is not necessary to direct the exhaust down against the ground.

Referring now to the drawings, the bed of the truck comprises a pair of longitudinal sills 6 and 7, which carry a flooring 8. The rear portion of the truck is mounted on an axle 9, which carries the wheels 10, and 11, while the forward portion of the truck is provided with a steering wheel 12. The latter may be manipulated in any suitable way, as by means of a hand wheel 13. The truck may be drawn along the ground in any way desired, the arrangement shown being intended for animal propulsion through the medium of a swingletree 14.

A blower 15 is mounted on the truck near the center of the same, a gasolene engine 16 driving the pulley 17 of the blower through the medium of a belt 18. By mounting the engine directly over the rear axle, it may be solidly supported without the necessity of making the truck unduly large and heavy.

The suction opening of the blower in connected to a pipe 19, which extends down through the truck, and has its lower portion 20 widened out and bent over, so as to occupy a position directly beneath the central line of the truck. At the same time, this suction pipe is contracted from its front to its rear at the point 21, as is well shown in Fig. 1. The forward portion 22 of the lower end of the suction pipe extends down fairly close to the ground, so that the space 23 left between said lower end and the ground shall be just about large enough to allow the largest twigs and debris to pass beneath it. The rear side 24 of the lower portion of the suction pipe is hinged at 25, so that it may swing rearwardly, when occasion arises; thus it comprises virtually a flap which may swing back and forth. Springs 26, well shown in Fig. 3 normally hold this flap in forward position. The lower end 27 of the flap extends down almost to the ground, but, of course, it may swing back to pass over obstructions, and to clear uneven portions of the ground.

The exhaust pipe 28 extends straight down, and has its lower portion 29 also widened out to a width substantially equal to that of the lower portion 20 of the suction pipe. However, a screen 30 is placed across the upper end of the exhaust pipe, so that particles of debris which are drawn up in the suction and thrown out by centrifugal force from the fan 31 will be caught and projected downwardly through a pipe 32, into a debris receptacle 33. In the construction shown, the latter comprises a bag, the upper portion 34 of which is reinforced by a collar 35 which may be attached to the lower portion of the pipe 32, so that the bag may be easily removed after it has become filled with the debris. It will be noted that the screen is rounded over and down from its rear portion 36 to its forward portion 37. By rounding it over in this manner, the debris will be caught and thrown forwardly into the mouth 38, of the pipe 32, thus largely preventing the debris from being caught on the corner 39 of the blower, and simply whirled around and around, instead of being carried down through the pipe 32.

Referring now to Figs. 1 and 4, the lower portion 40 of the exhaust pipe is contracted from front to rear. This will insure a strong blowing action at the point where the exhaust is delivered against the ground. It is intended that this exhaust shall thoroughly agitate the entire surface of the ground in advance of the arrival of the suction portion, and for this reason the parts should be so arranged to provide a strong draft at the point where the exhaust strikes the ground. The lower end 41 of the front portion of the exhaust pipe may be hinged at 42 to provide a flap, which may swing rearwardly to pass obstructions, springs 43 holding this flap in normal position. The upper portion 44 of the suction member connects directly with the rear side of the exhaust pipe. The suction member is provided with telescopic sides 45, which are connected to the upper portion 44, and to the flaps 24 and 41, so that the suction member is well closed in, while, at the same time, permitting sufficient movement of the flaps. These telescopic sides 45 may be made from heavy canvas, or any other suitable material.

As is well shown in Figs. 3 and 4, the lower portion of the suction member is widened out to cover a strip of ground almost equal in width to that of the entire truck. It will be understod that the width of the strip of ground to be cleaned may be made as great as desired by widening out the suction member still more, although the principle of operation would be the same as that herein illustrated and described.

Some kinds of plants are placed in rows comparatively close together, so that it might be difficult to design a truck of such width as not to injure the plant in passage. Of course the clear space between the plants on the two sides of the row depends upon the over-hanging of their branches. By pushing back the branches in the proper manner, the truck may be passed through and along a path which is apparently narrower than the truck itself. In the present instance, I provide means for pushing back the over-hanging branches to permit the truck to pass through without injuring their branches. The means illustrated comprises a number of rods, or wires, 46, suitably supported along each side of the truck, and having their rear portions 47 lying in a substantially vertical plane and substantially parallel to each other. In their forward portions 48, all of the wires are curved inwardly, the lower wires 49 being curved in not so rapidly as the upper wires 50, so that the wires assume a position, such as illustrated in Fig. 4, where the observer is looking at the front of the truck. In order to properly support the wires, a number of brackets 51 may be provided, each bracket being set inwardly some distance from the plane of the wires, and the wires being secured to the brackets by means of arms 52. By this construction, a space 53 is provided, so that the branches may slide rearwardly past the brackets without touching the same.

It is a general rule that the middle branches of a bush extend out farther than those in its upper portion. For this reason, the lower wires are carried out farther in their forward portions than are the upper wires. As the truck passes along between two rows of plants, the over-hanging branches will rise up and slide in between and on the wires, and will be bent upwardly by them a sufficient distance to allow the truck to pass through without injuring them. In this manner, the device is enabled to pick up the debris much more completely and thoroughly than would be the case if the width of the truck were limited to an amount equal to the narrow distance between the over-hanging branches of the rows of plants.

In Figs. 6 and 7, I show in detail the double fan construction shown in Fig. 1. In this case, a primary blower 54 and a secondary blower 55 are provided, both of them being driven by means of a common pulley 56. The suction pipe 19 enters the primary blower which delivers its air through a connection 57 to the secondary blower, the latter delivering its exhaust through the pipe 28. A screen 30 is placed across the discharge from the primary blower so as to intercept particles of debris and deliver them into a receptacle 34, as in the previous construction. Advantages of this twin blower construction are that a very compact arrangement of parts is possible, and that the exhaust air which is delivered down onto the ground in advance of the suction member does not come directly through the screen 30, but is delivered from a separate and distinct fan. Of course, the screen and associated piping of the single blower will tend somewhat to retard the exhaust, whereas in the present case the exhaust air comes directly from the secondary blower and is not impeded by the screen.

In the single fan arrangement, the air is sucked from the suction member into the single fan, and is delivered from the same directly to the ground in advance of the suction member, so that in this case the single fan serves the double function of sucking up the particles of debris from the ground and of agitating the ground in advance of the suction member.

I claim:

1. In a machine of the class described, the combination with a truck of a suction member depending therefrom and having its suction opening adjacent to the ground, a centrifugal fan on the truck, having a central suction intake and a peripheral exhaust opening, means for rotating the fan, a connection from the suction member to the intake, a connection from the exhaust opening to the ground at a point in advance of the suction member, a debris receptacle, a connection from the exhaust opening of the fan to the same, and a deflector extending across the peripheral exhaust opening to intercept particles of debris from the exhausting air and to deliver the same into the debris receptacle, substantially as described.

2. In a machine of the class described, the combination with a truck of a suction member and agitator suitably mounted thereon, and comprising a suction opening having its forward edge extending down close to the ground to leave a sufficient clearance for the passage of debris and having its rear portion in the form of a flap suitably hinged to permit the same to swing backwardly for passage over rough portions of ground, and an exhaust opening having its forward portion in the form of a flap suitably hinged to permit the same to swing backwardly for passage over particles of debris and over rough ground, a closure extending between the upper portion of the exhaust opening and the upper portion of the suction opening, and a telescopic connection suitably attached to the closure and to each side of each flap, and extending down close to the ground to completely inclose the space between the exhaust opening and the suction member, substantially as described.

3. In a machine of the class described, the combination with a truck of a suction member and agitator suitably mounted thereon, and comprising a suction opening having its forward edge extending down close to the ground to leave a sufficient clearance for the passage of debris, and having its rear portion in the form of a flap suitably hinged to permit the same to swing backwardly for passage over rough portions of ground, and an exhaust opening having its forward portion in the form of a flap suitably hinged to permit the same to swing backwardly for passage over particles of debris and over rough ground, a closure extending between the upper portion of the exhaust opening and the upper portion of the suction opening, a telescopic connection suitably attached to the closure and to each side of each flap, and extending down close to the ground to completely inclose the space between the exhaust opening and the suction member, and means for continually withdrawing air from the suction opening, and means for continually exhausting air through the exhaust opening, substantially as described.

4. In a boll-weevil machine, the combination of a carrier, a pair of centrifugal fans mounted on the same, a suction member and an exhaust member supported by the carrier at points adjacent the ground, a connection from the suction member to the intake of the first fan, a connection from the discharge of the second fan to the exhaust member, a debris receptacle, a connection from the discharge of the first fan to the intake of the second fan, a tangentially extending debris deflector across the discharge of the first fan, and a connection from the discharge of the first fan in advance of such deflector to the debris receptacle, substantially as described.

5. In a machine of the class described, the combination of a carrier, a suction member supported by the same, means for creating a suction of air therein, and a plurality of longitudinally extending deflector rods on each side of the carrier, having their rear portions lying in a substantially vertical plane, and having their forward portions inwardly curved, the upper rods being curved inwardly a greater amount than the lower rods, substantially as described.

THOMAS LUCAS.

Witnesses:
J. R. TINDALL,
W. G. LOGGINS,
P. W. PERSONS.